United States Patent
Helmsworth

(10) Patent No.: US 9,534,753 B2
(45) Date of Patent: Jan. 3, 2017

(54) SYSTEM OF ILLUMINATING POURED SURFACES

(71) Applicant: Thomas Helmsworth, Cincinnati, OH (US)

(72) Inventor: Thomas Helmsworth, Cincinnati, OH (US)

(*) Notice: Subject to any disclaimer, the term of this patent is extended or adjusted under 35 U.S.C. 154(b) by 0 days.

(21) Appl. No.: 15/084,863

(22) Filed: Mar. 30, 2016

(65) Prior Publication Data

US 2016/0208993 A1    Jul. 21, 2016

Related U.S. Application Data

(63) Continuation-in-part of application No. 14/481,159, filed on Sep. 9, 2014, now Pat. No. 9,411,084.

(51) Int. Cl.

| | |
|---|---|
| *F21V 8/00* | (2006.01) |
| *F21V 33/00* | (2006.01) |
| *G02B 6/50* | (2006.01) |
| *F21S 8/02* | (2006.01) |
| *E01C 17/00* | (2006.01) |
| *F21W 111/023* | (2006.01) |

(52) U.S. Cl.
CPC .............. *F21S 8/022* (2013.01); *E01C 17/00* (2013.01); *G02B 6/0008* (2013.01); *F21V 33/006* (2013.01); *F21V 2200/13* (2015.01); *F21W 2111/023* (2013.01); *G02B 6/504* (2013.01)

(58) Field of Classification Search
CPC .............. F21V 2200/00; F21V 2200/10; F21V 2200/13; F21V 2200/15; F21V 2200/17; F21V 33/006; G02B 6/0005–6/001; G02B 6/504; F21S 8/022; F21S 8/081; F21S 8/083; F21K 9/90; G09F 19/228; G09F 9/305; G09F 2019/223; F21W 2111/02; F21W 2111/023; F21W 2111/027
See application file for complete search history.

(56) References Cited

U.S. PATENT DOCUMENTS

2004/0032748 A1* 2/2004 Trudeau .............. B28B 23/0037
362/554

\* cited by examiner

*Primary Examiner* — Karabi Guharay
*Assistant Examiner* — Steven Horikoshi
(74) *Attorney, Agent, or Firm* — Dunlap Bennett & Ludwig PLLC

(57) ABSTRACT

A system for forming poured surfaces having a desired point of light patterns emitting from the top surface thereof is provided. The system retains the optic fibers along the desired point of light pattern through the pouring of the poured surface. The system incorporates a guide post and coupled positioning apparatus adapted to support each optic fiber prior to and during the pouring and setting of the poured surface so that the optic fibers protrude above the top surface after setting, to be cut flush, forming the desired pattern of points of light.

7 Claims, 4 Drawing Sheets

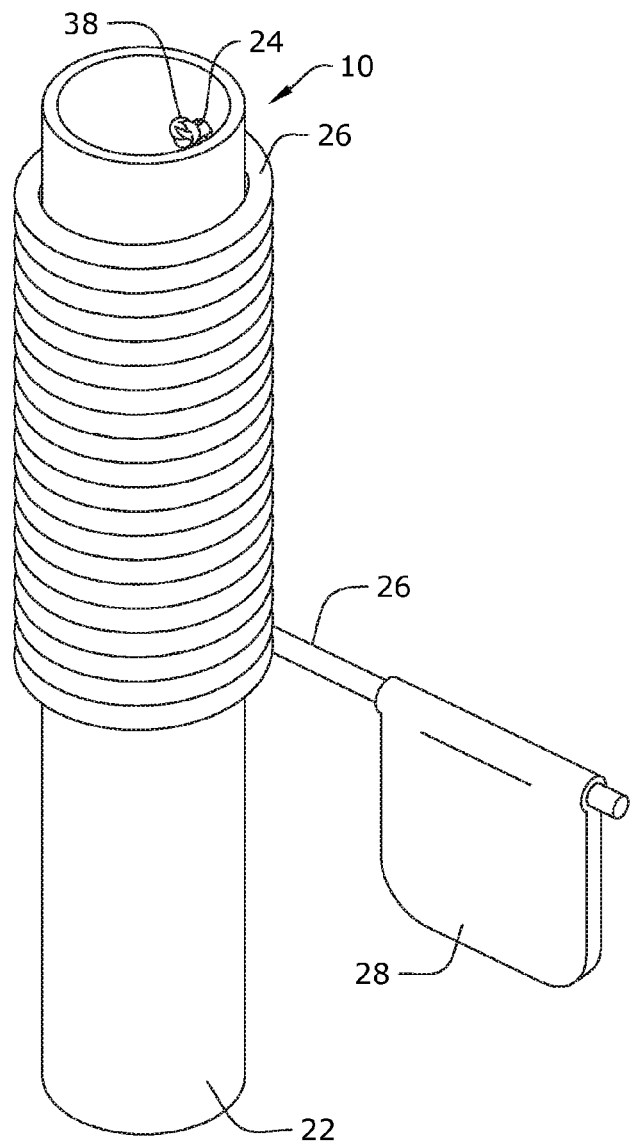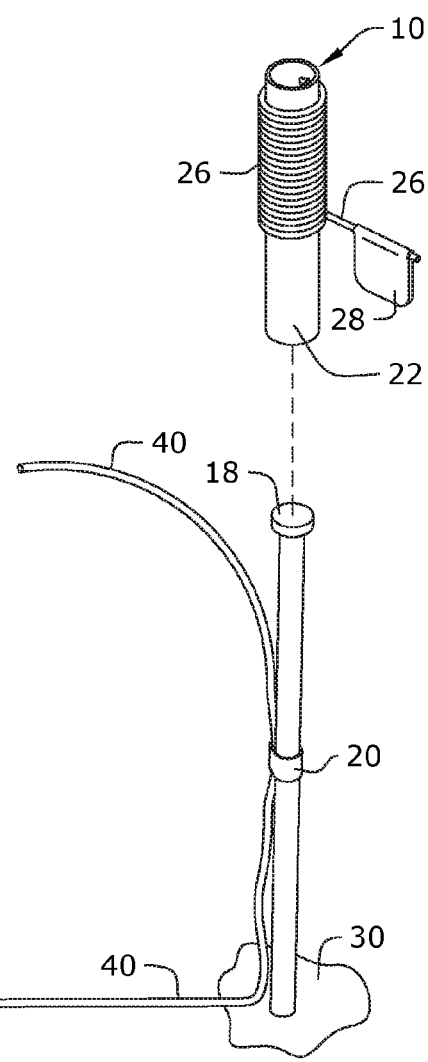
FIG. 1
FIG. 2

SYSTEM OF ILLUMINATING POURED SURFACES

CROSS-REFERENCE TO RELATED APPLICATION

This application is a continuation-in-part of the U.S. non-provisional application Ser. No. 14/481,159, filed Sep. 9, 2014, the contents of which are herein incorporated by reference.

BACKGROUND OF THE INVENTION

The present invention relates to lighting systems and, more particularly, to a system for illuminating poured surfaces through adaptable point of light patterns.

Current systems for providing illumination of walkways often supply more light than needed and so washout or otherwise detract from the scenery around the walkway, frustrating the lighting's aesthetic purpose or even causing night blindness. Embedding fiber optics in the walkway is currently available though only in prefabricated components with embedded fiber optics, which can be prohibitively expensive and preclude a user from designing their own desired point of light pattern.

As can be seen, there is a need for a system for installing fiber optic illumination in poured surfaces so that each optic fiber may be terminate flush with the top surface of the hardened poured surface, thereby enabling various points of light patterns there along, as desired.

When installing the optic fibers into poured surfaces, however, the fibers tend to get bent over and displaced under the pour flow of the pre-hardened, viscous cementitious material. As a result, someone currently desiring to create their own light pattern within a poured surface would not only have to place each optic fiber by hand, but would have difficulty even finding the optic fibers after the initial pour of the pre-hardened, viscous cementitious material.

SUMMARY OF THE INVENTION

In one aspect of the present invention, a system for created a desired pattern of points of light emitting from a top of a poured surface includes a pour space defined by a predetermined height above a ground surface; at least one guide post joined to the ground surface so as to define the desired pattern of points of light; a position sleeve removably coupled to an upper portion of each guide post so as to provide a strand aperture between the upper portion and an inner diameter of the position sleeve; and an operative optic fiber extending from a light source through the pour space to each guide post, so as to pass through the strand aperture, and protrude above the predetermined height.

In another aspect of the present invention, the system for created a desired pattern of points of light emitting from a top of a poured surface includes a pour space defined by a predetermined height above a ground surface; at least one guide post joined to the ground surface so as to define the desired pattern of points of light; a position sleeve removably coupled to an upper portion of each guide post so as to provide a strand aperture between the upper portion and an inner diameter of the position sleeve; an operative optic fiber extending from a light source through the pour space to each guide post, so as to pass through the strand aperture, and protrude above the predetermined height; at least one connector for coupling each optic fiber to an associated guide post; a coil spring for each position sleeve, wherein each coil spring is adapted to unwind from a wound condition to an elongated condition, wherein the wound condition mounts an upper portion of an associated position sleeve, and wherein the elongated condition terminates above the predetermined height; a tab connected to each coil spring, wherein the tab is above the predetermined height in the elongated condition; and a poured surface poured to the predetermined height so as to engulf each positioning sleeve, wherein each optic fiber is cut flush with the predetermined height.

These and other features, aspects and advantages of the present invention will become better understood with reference to the following drawings, description and claims.

BRIEF DESCRIPTION OF THE DRAWINGS

FIG. 1 is a perspective view of an exemplary embodiment of the present invention;

FIG. 2 is an exploded view of an exemplary embodiment of the present invention;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a system for forming poured surfaces wherein embedding optic fibers produce a desired point of light pattern along the top of the poured surface. The system incorporates a guide post and coupled positioning apparatus adapted to support each optic fiber prior to and during the pouring and setting of the poured surface so that the optic fibers protrude above the top surface after setting, to be cut flush, forming the desired pattern of points of light. The present invention may include a system for illuminating poured surfaces 34 with user-determined point of light patterns, wherein the system provides a lighting system 50 and at least one positioning apparatuses 10 and guide post 18.

Figure 10:
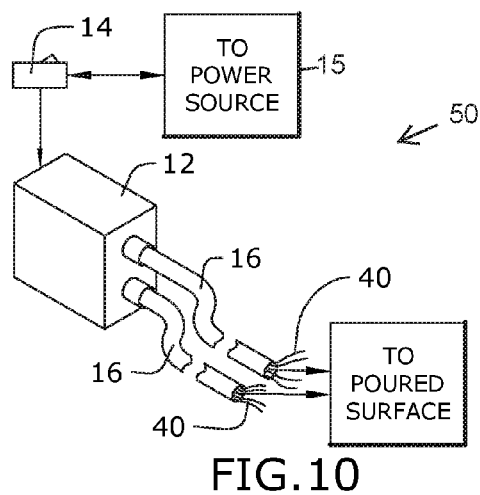
FIG. 10 is a schematic view of a lighting system of the present invention.

Referring to FIG. 10, the lighting system 50 may include a light source 12, a switch 14, a power source 15, and a plurality of fiber optic fibers 40. The plurality of fiber optic fibers 40 may form at least one bundle 16 of optic fibers 40. The light source 12 may include a light emitting diode (LED) light engine or the like. Each fiber optic strand 40 has an input end and an output end, wherein each input end may be in optical communication with the light source 12.

Figure 9:
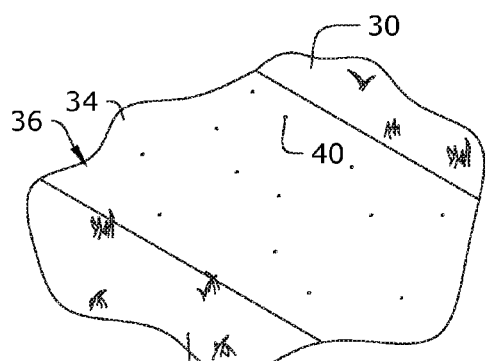
FIG. 9 is a perspective view of an exemplary embodiment of the present invention, shown in use.

Referring to FIG. 9, the poured surface 34 may be composed of concrete, asphalt, cement, grout, any composite material composed of water, coarse granular material embedded in a hard matrix of material, plastic, plasticized material or the like. The poured surface 34 may be constructed by installing at least one pouring form 32 of a predetermined height above a ground surface 30, defining a pour space of a desired shape. The at least one pouring form 32 allows an individual to form the poured surface 32 into desired shapes and heights that can be accommodated by the ground surface 30. The poured surface 32, after drying, setting and or curing, forms a top surface 36.

Referring to FIG. 1, a position apparatus 10 may include a tubular positioning sleeve 22 coupled to a coil spring 26. The coil spring 26 may extend from a first end 38 to a second end 30, wherein the coil spring 26 forms a plurality of helical turns between the first and second ends 38 and 28, winding the coil spring 26 about an outer sleeve diameter in a wound condition. The positioning sleeve 22 may provide a first hole 24 through which the first end 38 is slidably received into an inner sleeve diameter, and wherein the first end 38 provides an obstruction so that the first end cannot slide back out the first hole 24. The second end 28 may provide a tab or flag.

FIG. 2 illustrates how a guide post 18 having a lower portion and an upper portion, wherein the lower portion may be generally perpendicularly connected to the ground surface 30 by, for example, driving the lower portion into the ground surface 30 so that the upper portion terminates below the predetermined height of the pouring form 32, as further illustrated in FIG. 4. In certain embodiments, the upper portion of the guide post 18 may not have the head as shown in the illustrations, rather being more cylindrical throughout the upper portion, as long as it function in accordance with the present invention as disclosed herein.

Figure 4:
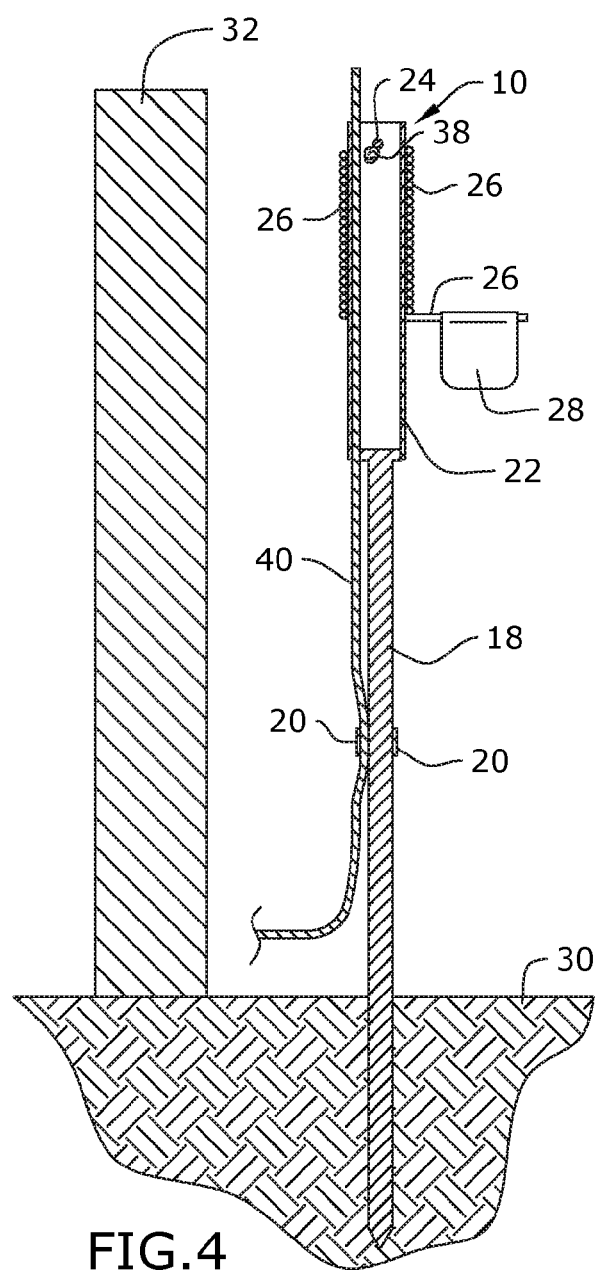
FIG. 4 is a section view of an exemplary embodiment of the present invention, illustrating a pre-pour condition, wherein a coil spring is in a wound condition.

The inner sleeve diameter may be dimensioned and adapted to slidably receive or be removably connected to the upper portion of the guide post 18 (with or without a head), while still providing a strand aperture between the upper portion and the inner sleeve diameter, through which at least one optic fiber 40 may slidably be passed, as illustrated in FIG. 4. Each optic fiber 40 may extend from the strand aperture, passing through the positioning sleeve 22, and protruding from the positioning sleeve 22 so as to extend over the predetermined height of the pouring forms 32. Each positioning sleeve 22 is adapted to shield the associated at least one optic fiber 40 from the tendency of the optic fiber 40 to get bent over and/or displaced under the pour flow of the pre-hardened, viscous cementitious material.

Referring to FIGS. 2 through 7, each optic fiber 40 may extend back to the light source 12, being secured to the guide post 18 along the way by connectors 20 for preventing the optic fiber 40 from getting displaced, lost or otherwise swept away under the pour flow of the pre-hardened, viscous cementitious material of the pour surface 34. The connectors 20 may be joining straps or any other suitable connectors for joining the associated optic fiber 40 to the guide post 18.

Figure 3:
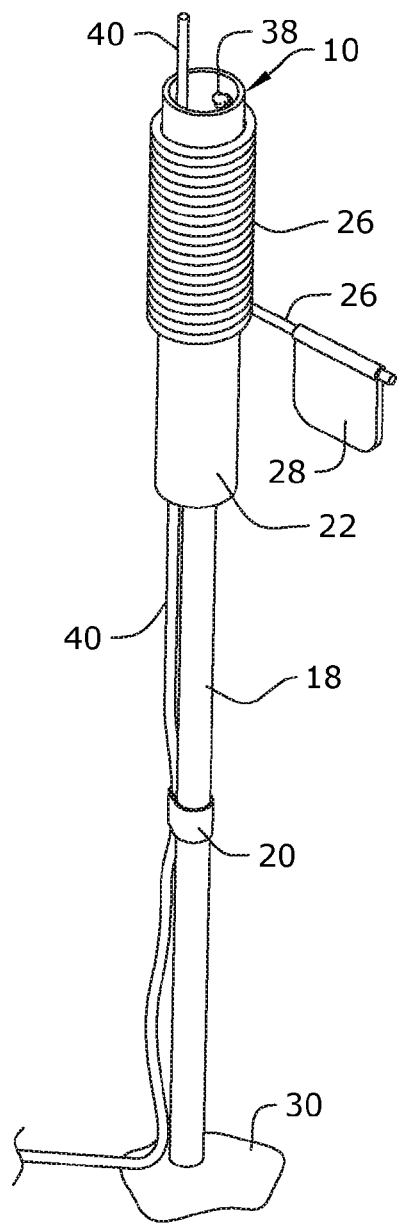
FIG. 3 is a perspective view of an exemplary embodiment of the present invention.
Figure 5:
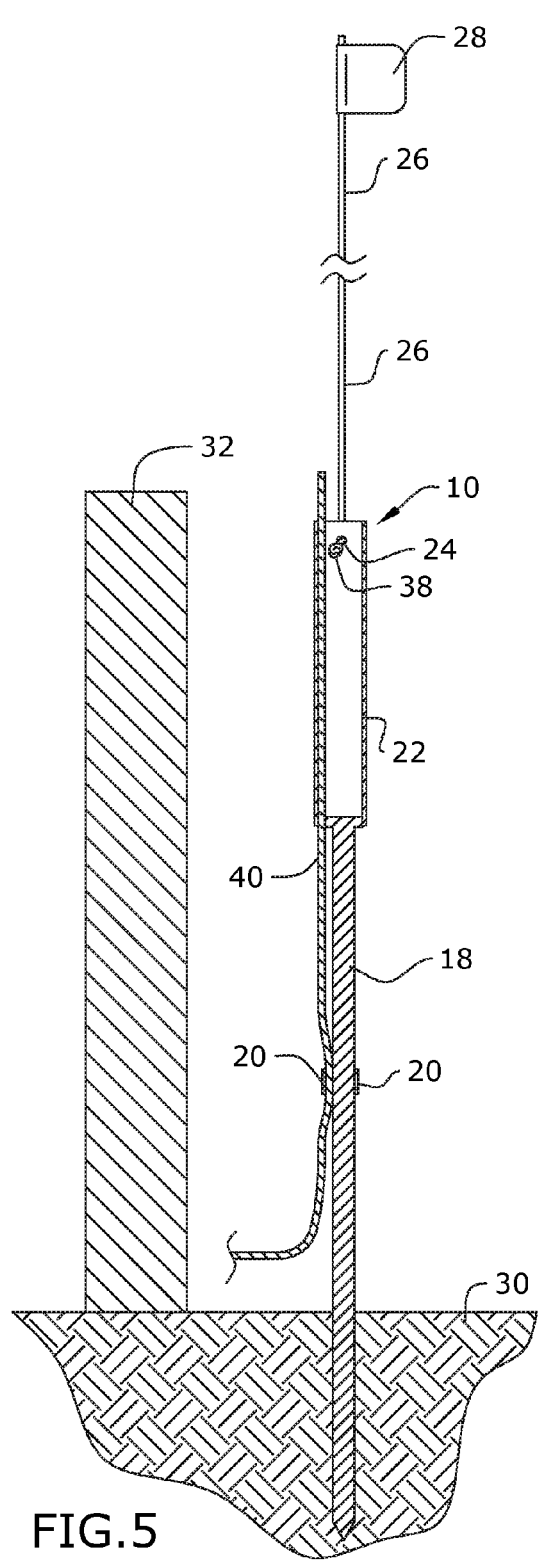
FIG. 5 is a section view of an exemplary embodiment of the present invention, illustrating the pre-pour condition with the coil spring is in an elongated condition.

The coil springs 26 may be removably wound about an upper portion of the positioning sleeves 22, as illustrated in FIG. 1-3. The coil springs 26 being adapted so as to be biased in the wound condition and an elongated condition so that a sufficient axial force on the second end 28 unwinds the coil spring 26 from the wound condition, as illustrated in FIGS. 1-3, to the elongated condition, as illustrated in FIG. 5.

Figure 8:
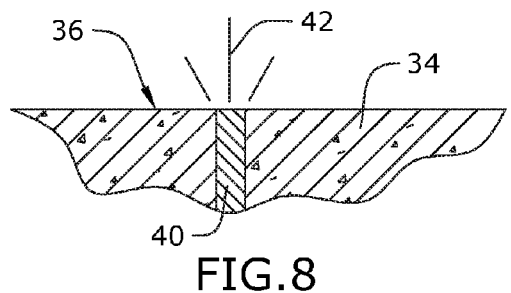
FIG. 8 is a detail section view of an exemplary embodiment of the present invention, illustrating a trimmed optic fiber and its emittance of a point of light.

The system of the present invention may incorporate a method for installing the optic fibers 40 in poured surfaces 34 so that an output end of each optic fiber is flush with the top 36 of the poured surface 34, emitting the point of light 42 there from, as illustrated in FIG. 8. First, prior to pouring the poured surface 34 into the pour space of a desired shape and predetermined height, afforded by the ground 30 and the pouring forms 32, the plurality of guide posts 18 are driven into the ground surface 30 near every point of a desired pattern of points of light 42, with the upper portion of each guide post 18 lower than the predetermined height of the pouring form 32. Subsequently, the rigid positioning sleeve 22 is removably coupled to each upper portion of the guide post 18 so that the positioning sleeve 22 affords the strand aperture for passage of a optic fiber 40, and wherein the positioning sleeve 22 terminates slightly lower than the predetermined height of the pouring form 32.

The lighting system 50 may be placed in a nearby waterproof enclosure, with the desired number of optic fibers 40 optically communicated thereto, so that each optic fiber extends within the pour space to each respective guide post 18

Then each optic fiber 40 is fed through the respective strand aperture so as to pass through the inner sleeve diameter and protrude above the predetermined height of the pour space. Using the connectors 20 the user may connect each optic fiber 40 to its respective guide post 18.

Then the user unwinds each coil spring 26 from the wound condition to the elongated condition, so that each second end/tab/flag 28 extends above the predetermined height.

Figure 6:
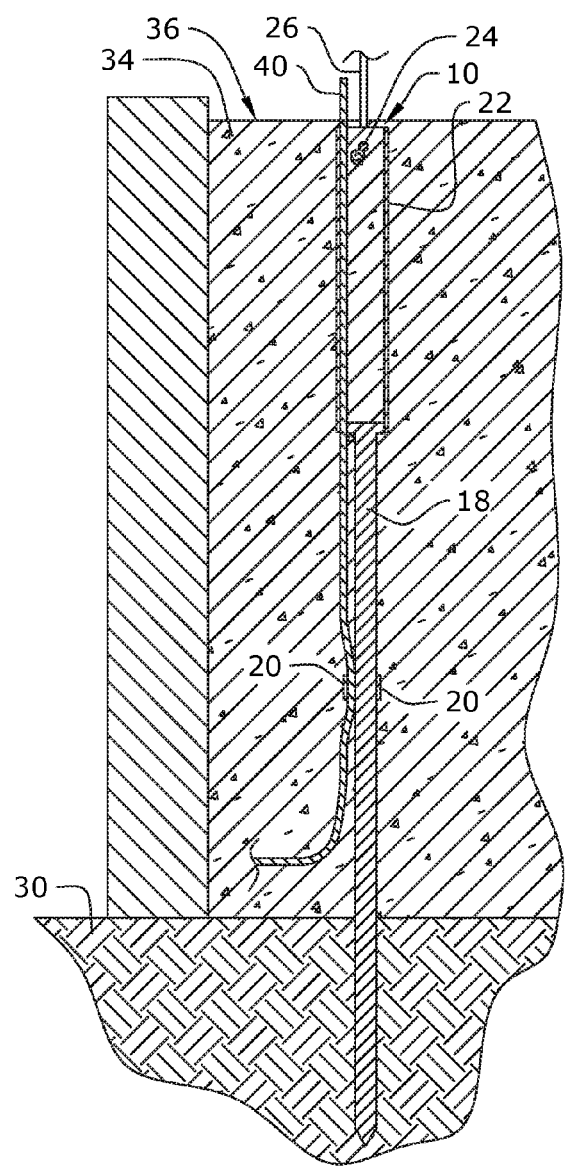
FIG. 6 is a section view of an exemplary embodiment of the present invention, illustrating a post-pour condition.
Figure 7:
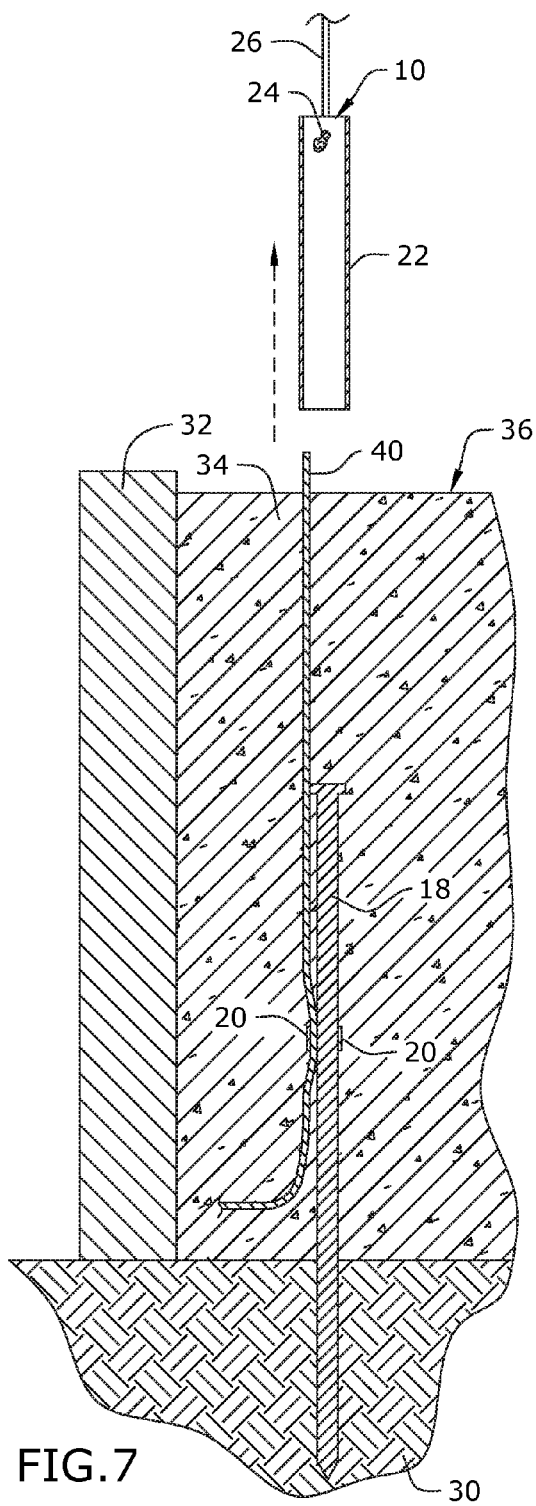
FIG. 7 is a section view of an exemplary embodiment of the present invention, illustrating the post-pour, yet pre-hardened condition wherein a positioning sleeve is being removed from the pour space.

The poured surface 34 is then poured to fill the pour space and the positioning sleeves 22, as illustrated in FIG. 6. The poured surface 32 may then be leveled.

Before the poured surface 34 has set, the positioning sleeves 22 are removed by the user pulling on the coil spring 26 second end/tab/flags 28 protruding beyond the top 36 of the poured surface 34, which affords a useful visual indication for this purpose. With the positioning sleeve 22 removed, the output end of the associated optic fiber 40 will protrude above the leveled top surface 36, thereby the user may straighten said optic fiber 40 for subsequent orthogonal trimming.

After the concrete has set, additional cement is placed around any defects around the fibers 40. After 24 hours, the at least one fiber optic strand 40 is trimmed substantially flush with the top surface 36 so as to expose a new output end emitting a point of light 42 from the top surface 34. The newly trimmed output end may be understood to be the source of the point of light 42.

The lighting system 50 is then electrically connected to the power source 15, allowing the pattern of points of light to be lit when desired.

It is contemplated that the present invention may be particularly useful when used in connection with any poured volumes, including liquids or plastics, whose resulting pouring flow may displace a desired pattern of points of light 42 to be submerged or embedded therein.

It should be understood, of course, that the foregoing relates to exemplary embodiments of the invention and that modifications may be made without departing from the spirit and scope of the invention as set forth in the following claims.

What is claimed is:

1. A system for created a desired pattern of points of light emitting from a top of a poured surface, comprising:
   a pour space defined by a predetermined height above a ground surface;
   at least one guide post joined to the ground surface so as to define the desired pattern of points of light;
   a position sleeve removably coupled to an upper portion of each guide post so as to provide a strand aperture between the upper portion and an inner diameter of the position sleeve; and
   an operative optic fiber extending from a light source through the pour space to each guide post, so as to pass through the strand aperture, and protrude above the predetermined height.

2. The system of claim 1, further comprising at least one connector for coupling each optic fiber to an associated guide post.

3. The system of claim 1, further comprising a coil spring for each position sleeve, wherein each coil spring is adapted to unwind from a wound condition to an elongated condition, wherein the wound condition mounts an upper portion of an associated position sleeve, and wherein the elongated condition terminates above the predetermined height.

4. The system of claim 3, further comprising a tab connected to each coil spring, wherein the tab is above the predetermined height in the elongated condition.

5. The system of claim 1, further comprising the poured surface poured to the predetermined height so as to engulf each positioning sleeve.

6. The system of claim 1, wherein each optic fiber is cut flush with the predetermined height.

7. A system for created a desired pattern of points of light emitting from a top of a poured surface, comprising:
   a pour space defined by a predetermined height above a ground surface;
   at least one guide post joined to the ground surface so as to define the desired pattern of points of light;
   a position sleeve removably coupled to an upper portion of each guide post so as to provide a strand aperture between the upper portion and an inner diameter of the position sleeve;
   an operative optic fiber extending from a light source through the pour space to each guide post, so as to pass through the strand aperture, and protrude above the predetermined height;
   at least one connector for coupling each optic fiber to an associated guide post;
   a coil spring for each position sleeve, wherein each coil spring is adapted to unwind from a wound condition to an elongated condition, wherein the wound condition mounts an upper portion of an associated position sleeve, and wherein the elongated condition terminates above the predetermined height;
   a tab connected to each coil spring, wherein the tab is above the predetermined height in the elongated condition; and
   a poured surface poured to the predetermined height so as to engulf each positioning sleeve, wherein each optic fiber is cut flush with the predetermined height.

* * * * *